(12) United States Patent
Stratton et al.

(10) Patent No.: US 9,234,750 B2
(45) Date of Patent: Jan. 12, 2016

(54) SYSTEM AND METHOD FOR OPERATING A MACHINE

(75) Inventors: Kenneth L. Stratton, Dunlap, IL (US); Troy K. Becicka, Sahuarita, AZ (US); Michael Taylor, Swissvale, PA (US); Thandava K. Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 659 days.

(21) Appl. No.: 13/561,833

(22) Filed: Jul. 30, 2012

(65) Prior Publication Data

US 2014/0032132 A1 Jan. 30, 2014

(51) Int. Cl.
*G01B 3/00* (2006.01)
*G01B 21/20* (2006.01)
*G06F 9/00* (2006.01)

(52) U.S. Cl.
CPC . *G01B 21/20* (2013.01); *G06F 9/00* (2013.01)

(58) Field of Classification Search
None
See application file for complete search history.

(56) References Cited

U.S. PATENT DOCUMENTS

| 5,987,371 | A  | * | 11/1999 | Bailey et al. | 701/50 |
| 6,493,612 | B1 | | 12/2002 | Bisset et al. | |
| 6,984,952 | B2 | | 1/2006 | Peless et al. | |
| 7,734,397 | B2 | | 6/2010 | Peterson et al. | |
| 7,881,497 | B2 | | 2/2011 | Ganguli et al. | |
| 2009/0237263 | A1 | * | 9/2009 | Sawyer et al. | 340/686.6 |
| 2011/0276236 | A1 | * | 11/2011 | Shimada | 701/50 |
| 2013/0197857 | A1 | * | 8/2013 | Lu et al. | 702/141 |

FOREIGN PATENT DOCUMENTS

JP 2000-137522 A 5/2000

* cited by examiner

*Primary Examiner* — Mohamed Charioui
*Assistant Examiner* — Zannatul Ferdous
(74) *Attorney, Agent, or Firm* — Leydig, Voit & Mayer, Ltd.

(57) ABSTRACT

A system for automated control of a machine within a work area having a crest includes a first data map and a second data map. At least one sensor system generates operating data indicative of a change in terrain and a controller compares the operating data to the first data map while the machine is within a zone adjacent the crest. If the change in terrain exceeds a threshold, the controller generates an alert command signal. A method is also provided.

9 Claims, 3 Drawing Sheets

SYSTEM AND METHOD FOR OPERATING A MACHINE

TECHNICAL FIELD

This disclosure relates generally to controlling a machine, and more particularly, to a system and method for changing threshold conditions of an automated system adjacent a crest.

BACKGROUND

Autonomous or semi-autonomous movement of mechanisms and machines is increasingly desirable for many operations including those related to mining, earthmoving and other industrial activities. Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Maps with designated paths and boundaries may be set for such autonomously and semi-autonomously operated machines. At a site in which a machine may operate in proximity to a crest such as a ridge, embankment, high wall or other change in elevation or sloped area, remaining within the designated boundaries becomes especially critical. Systems that typically monitor and control autonomously or semi-autonomously operated machines may include global positioning systems or systems that determine position based upon the revolutions of the tires or other driven components of the machine. While such systems are capable of determining the position of a machine relative to a map, they do not account for changes that occur to the terrain after the map has been developed.

Automated systems for detecting a change in terrain may be used to determine whether a machine is approaching or adjacent a crest. Calibration of such change in terrain systems often require a balance between a system that is too sensitive, which may result in the generation of false positive responses, and a system that may allow a machine to move closer to the crest than is desirable.

U.S. Pat. No. 7,881,497 discloses a system for controlling an autonomous vehicle through a vision based navigation and guidance system. The system uses a camera to detect images and applies such images to an edge detection circuit. The edge detection information is used with navigation information that may be provided from various types of systems including inertial movement, global positioning, stereo vision, radar, mapping and the like.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for automated control of a machine includes at least one sensor system for generating operating data indicative of a change in terrain. A controller is configured to store a work area for the machine including a crest zone within the work area that extends a predetermined distance from a crest into the work area. The controller is further configured to store a first data map of operating data for use while the machine is operating within the crest zone and store a second data map of operating data for use while the machine is operating outside of the crest zone. The controller is also configured to compare the operating data to the first data map of operating data while the machine is within the crest zone to determine whether the operating data exceeds a first threshold condition and generate a first alert command signal if the operating data exceeds the first threshold condition while the machine is operating within the crest zone.

In another aspect, a method of controlling operation of a machine within a work area having a crest includes generating operating data indicative of a change in terrain generally adjacent the machine and storing a work area for the machine including a crest zone within the work area that extends a predetermined distance from the crest into the work area. A first data map of operating data is stored for use while the machine is operating within the crest zone and a second data map of operating data is stored for use while the machine is operating outside of the crest zone. The operating data is compared to the first data map of operating data while the machine is within the crest zone to determine whether the operating data exceeds a first threshold condition and a first alert command signal is generated if the operating data exceeds the first threshold condition while the machine is operating within the crest zone.

In still another aspect, a machine includes a prime mover, and a system for automated control of the machine. The system includes at least one sensor system for generating operating data indicative of a change in terrain. A controller is configured to store a work area for the machine including a crest zone within the work area that extends a predetermined distance from a crest into the work area. The controller is further configured to store a first data map of operating data for use while the machine is operating within the crest zone and store a second data map of operating data for use while the machine is operating outside of the crest zone. The controller is also configured to compare the operating data to the first data map of operating data while the machine is within the crest zone to determine whether the operating data exceeds a first threshold condition and generate a first alert command signal if the operating data exceeds the first threshold condition while the machine is operating within the crest zone.

DETAILED DESCRIPTION

Figure 1:
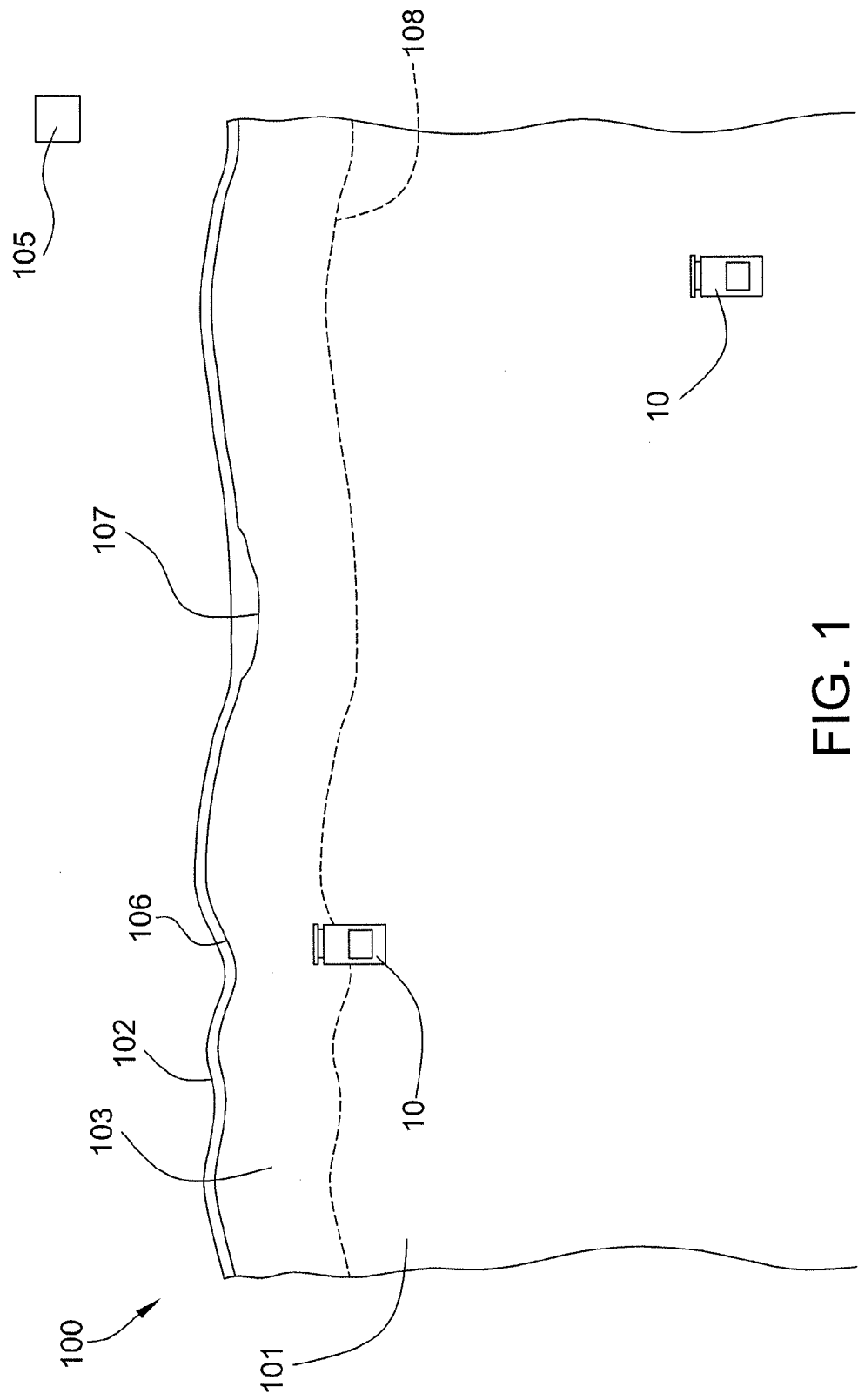
FIG. 1 shows a schematic view of a work site at which a machine incorporating the principles disclosed herein may be used.

FIG. 1 depicts a diagrammatic illustration of a work site 100 at which one or more machines 10 may operate in an autonomous, a semi-autonomous, or manual manner. Work site 100 may be a portion of a mining site, a construction site or any other area in which movement of machine 10 is desired. As depicted, work site 100 includes a work area 101 having a crest 102 defining an edge of a ridge, embankment, high wall or other change in elevation. The crest 102 may take any of a number of different forms at which a change in terrain occurs and may include various straight and curved sections as depicted in FIG. 1.

As used herein, a machine 10 operating in an autonomous manner operates automatically based upon information received from various sensors without the need for human operator input. As an example, a haul truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
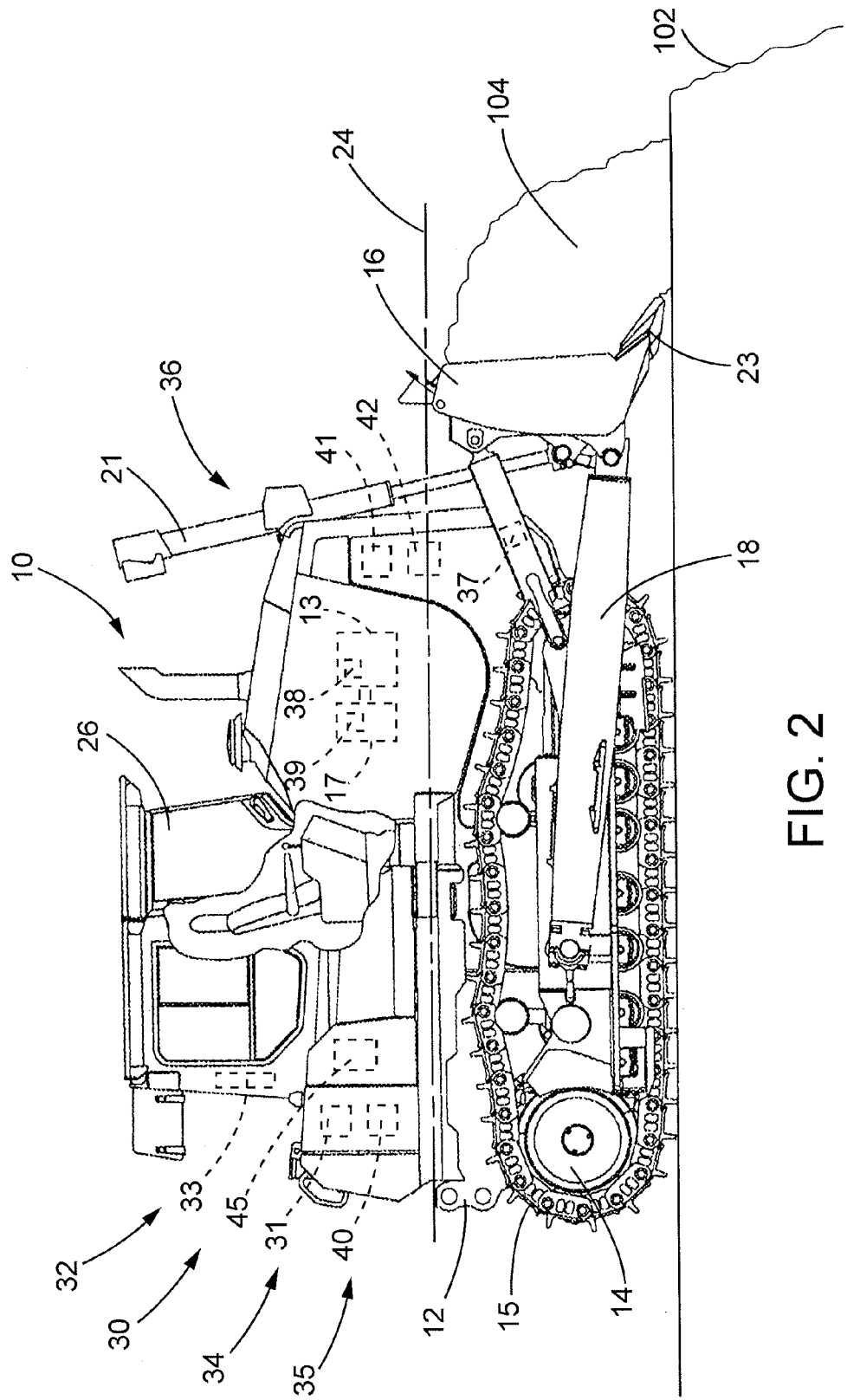
FIG. 2 shows a diagrammatic illustration of a machine in accordance with the disclosure.

FIG. 2 shows a diagrammatic illustration of a machine 10 such as a dozer adjacent crest 102 with a blade 16 pushing material 104 over the crest. The machine 10 includes a frame 12 and a prime mover such as an engine 13. A ground-engaging drive mechanism such as a track 15 is driven by a drive wheel 14 on each side of machine 10 to propel the machine 10. Although machine 10 is shown in a "track-type" configuration, other configurations, such as a wheeled configuration, may be used.

The systems and methods of the disclosure may be used with any machine propulsion and drivetrain mechanisms applicable in the art including hydrostatic, electric, or a mechanical drive. As depicted in FIG. 2, machine 10 may be configured with a type of mechanical drive system so that engine 13 drives a torque converter 17 which in turn drives a transmission (not shown). The transmission may be operatively connected to the drive wheels 14 and the tracks 15. Operation of the engine 13 and transmission, and thus the drive wheels 14 and tracks 15, may be controlled by a control system 30 including a controller 31. Other types of prime movers and drive systems are contemplated.

Machine 10 may include a ground engaging work implement such as blade 16 pivotally connected to frame 12 by arms 18 on each side of machine 10. First hydraulic cylinder 21 coupled to frame 12 supports blade 16 in the vertical direction, and allows blade 16 to move up or down vertically from the point of view of FIG. 2. Second hydraulic cylinders 22 on each side of machine 10 allow the pitch angle of blade tip 23 to change relative to a centerline 24 of the machine.

Machine 10 may be equipped with a plurality of sensors that provide data indicative (directly or indirectly) of various operating parameters of the machine. The hydraulic system may include sensors for monitoring pressure within the system as well as the pressure of specific cylinders. For example, one or both of the second hydraulic cylinders 22 may include an associated pressure sensor 37. Sensors may be provided to monitor the operating conditions of the engine 13 and drivetrain such as an engine speed sensor 38 and a torque converter speed sensor 39. The machine may also include an accelerometer 40 for determining the acceleration of the machine along various axes. Still further, a pitch angle sensor 41 and a pitch rate sensor 42 may be included for determining roll, pitch and yaw of machine 10. Other sensors necessary or desirable for operating the machine 10 may be provided.

Machine 10 may have a control system 30 that interacts with a positioning system such as a global positioning system ("GPS") to control the movement of the machine about the work site 100. In addition, a network system such as wireless network system 105 may provide generalized commands to the control system 30 that the control system utilizes to generate specific commands to operate the various systems of machine 10. In the alternative, the wireless network system 105 may provide some or all of the specific commands that are then transmitted by the control system 30 to the systems of the machine 10. Machine 10 may be one of several machines operating at work site 100.

Rather than operating the machine 10 in an autonomous manner, an operator may have the ability to operate the machine 10 remotely such as with a wireless control unit 45. Still further, machine 10 may also include a cab 26 that an operator may physically occupy and provide input to control the machine. Cab 26 may include one or more input devices through which the operator issues commands to control the propulsion and steering of the machine as well as operate various implements associated with the machine. In one embodiment, machine 10 may be configured to be operated autonomously, semi-autonomously, or manually. In case of semi-autonomous or manual operation, the machine may be operated by remote control and/or by an operator physically located within the cab 26.

The control system 30, as shown generally by an arrow in FIG. 2 indicating association with the machine 10, may include an electronic control module or controller 31. The controller 31 may receive input command signals from the wireless network system 105, remote control input command signals from an operator operating machine 10 remotely or operator input command signals from an operator operating the machine 10 from within cab 26. The controller 31 may control the operation of the drivetrain as well as the hydraulic systems that operate the ground engaging work implement such as blade 16. The control system 30 may include one or more sensors to provide data and other input signals representative of various operating parameters of the machine 10. The term "sensor" is meant to be used in its broadest sense to include one or more sensors and related components that may be associated with the machine 10 and that may cooperate to sense various functions, operations, and operating characteristics of the machine.

The controller 31 may be an electronic controller that operates in a logical fashion to perform operations, execute control algorithms, store and retrieve data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller such as power supply circuitry, signal conditioning circuitry, driver circuitry, and other types of circuitry.

The controller 31 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 31 may be implemented in hardware and/or software without regard to the functionality. The controller 31 may rely on one or more data maps relating to the operating conditions of the machine 10 that may be stored in the memory of controller. Each of these maps may include a collection of data in the form of tables, graphs, and/or equations.

A position sensing system 32, as shown generally by an arrow in FIG. 2 indicating association with the machine 10, may include a position sensor system 33 to sense a position of the machine relative to the work area 101. The position sensor system 33 may include a plurality of individual sensors that cooperate to provide signals to controller 31 to indicate the position of the machine 10. The controller 31 may determine the position of the machine 10 within work area 101 as well as the orientation of the machine such as the heading, pitch and roll. In doing so, the dimensions of the machine 10 may be stored within the controller 31 with the position sensor system defining a datum or reference point on the machine and the controller using the dimensions to determine the outer boundary of the machine. Such position sensor system 33 may be a series of GPS sensors, an odometer or other wheel rotation sensing sensor, a perception based system or may use other systems such as lasers to determine the position of machine 10.

Although crest 102 may define the edge of a ridge, embankment, high wall or other change in elevation or sloped area, an electronic map of the crest 102 referred to herein as the boundary of operation or outer boundary 106 of the work area 101 as established within controller 31 or remotely in a system associated with the wireless network system 105 may vary from the actual crest position. In the example depicted in FIG. 1, outer boundary 106 generally follows and is slightly inside of crest 102 along most of its length. At section 107, however, the outer boundary is depicted as varying substantially from the crest 102. Variations between the physical crest 102 and the stored outer boundary 106 may be due to material that has been moved without a corresponding update of the outer boundary 106 such as by material moved by another machine, due to shifting of the material or otherwise. Still further, errors may occur while setting, storing, transmitting or changing the outer boundary 106 within a computer system. In other words, for a variety of reasons, the outer boundary 106 of the work area 101 stored within or remotely from the controller 31 may be different from the actual physical location of crest 102.

Work area 101 may include a crest zone 103 that extends a predetermined width or distance from the crest 102 into the work area 101. The crest zone 103 may be used as a buffer or zone in which additional measures or processes may be used to reduce the likelihood that machines 10 will move closer to crest 102 than desired. The width of the crest zone 103 may be fixed for a particular work site 100, a particular work area 101 or may even change along the crest 102. Factors that influence the width of the crest zone 103 may include the height and angle of the slope adjacent the crest 102, environmental conditions in which the machine 10 is being operated as well as the type of material at the work area 101. As described in more detail below, a process may be used once the machine 10 enters the crest zone 103 to determine whether the machine has encountered a change in terrain such as that adjacent crest 102 and automatically reverse the movement of the machine away from the crest.

In one example, the outer boundary 106 may be mapped or determined and the crest zone 103 calculated as extending a predetermined width or distance from the outer boundary 106. The edge of the crest zone 103 may be defined by a crest zone boundary 108 that may generally follow the outer boundary 106. As a result, each of the outer boundary 106 and the crest zone boundary 108 may define a path or reference that is representative of or approximates the position of the crest 102.

In view of the possible differences between the actual crest 102 and the electronic map of outer boundary 106, it may be desirable to utilize an additional or secondary system, in addition to the position sensing system 32, when operating machine 10 near a crest 102 to reduce the likelihood that the machine 10 will unintentionally be moved closer to crest 102 than desired. Such an additional system may be particularly useful when operating the machine 10 in an autonomous or semi-autonomous manner but may also be useful when operating the machine manually such as by remote control or with an operator located in the cab 26.

The control system 30 may include an additional system such as a crest detection system 34 shown generally by an arrow in FIG. 2 indicating association with the machine 10. One type of crest detection system 34 that may be used to sense the crest 102 may be an implement load monitoring system 35 shown generally by an arrow in FIG. 2. The implement load monitoring system 35 may include a variety of different types of implement load sensors depicted generally by an arrow in FIG. 2 as an implement load sensor system 36 to measure the load on the ground engaging work implement or blade 16. As blade 16 of machine 10 moves material 104 over the crest 102 as depicted in FIG. 2, the load on the blade will be reduced. Accordingly, the implement load sensor system 36 may be utilized to measure or monitor the load on the blade 16 and a decrease in load may be registered by the controller 31 as a change in terrain due to the machine 10 being adjacent the crest 102. In other words, the controller 31 may determine a change in terrain based at least in part upon a change in the load on blade 16.

In one embodiment, the implement load sensor system 36 may embody one or more pressure sensors 37 for use with hydraulic cylinder, such as second hydraulic cylinders 22, associated with blade 16. Signals from the pressure sensor 37 indicative of the pressure within the second hydraulic cylinders 22 may be monitored by controller 31. Upon receipt of a signal indicating a substantial reduction in pressure within the second hydraulic cylinders 22, the controller 31 may determine that the load on blade 16 has been substantially reduced due to the material 104 having been pushed over crest 102. Other manners of determining a reduction in cylinder pressure associated with a reduction in the load on blade 16 are contemplated, including other manners of measuring the pressure within second hydraulic cylinders 22 and measuring the pressure within other cylinders associated with the blade.

In another embodiment, the implement load sensor system 36 may embody sensors for measuring a difference between output from the engine 13 and the output from the torque converter 17. More specifically, an engine speed sensor 38 may be utilized to generate a signal indicative of the speed or output of the engine 13. A torque converter speed sensor 39 may be utilized to monitor the output speed of the torque converter 17. During an operation such as moving material with blade 16, the engine output speed indicated by engine speed sensor 38 and the torque converter output speed indicated by torque converter speed sensor 39 may be relatively constant. Upon moving material 104 over the crest 102 with blade 16, the load on the blade will be substantially reduced and thus cause a change in the relative speeds between the engine 13 and the torque converter 17. Accordingly, by monitoring the difference between the engine speed and the torque converter speed, a reduction in load on the blade may be determined indicative of the material 104 having been pushed over crest 102.

Other manners of measuring differences between prime mover output and other components within the propulsion and drivetrain mechanisms that are reflective of a change in load on the implement are also contemplated. Still further, in alternate embodiments in which the machine propulsion and drivetrain mechanisms are hydrostatic or electric, the implement load sensor system may embody other sensors that detect a difference between output from the prime mover and other aspects of the propulsion and drivetrain mechanisms that may be used by the controller 31 to detect a reduction in load on the blade 16.

In still another embodiment, implement load sensor system 36 may embody an acceleration sensor such as a three-axis accelerometer 40 for providing an acceleration signal indicative of measured acceleration of the machine 10. Upon moving a load of material 104 past the crest 102, the machine 10 may accelerate due to the reduction in load on the blade 16. Controller 31 may utilize such acceleration of the machine 10 to determine that the machine has reached crest 102. When using accelerometer 40 to determine proximity to the crest 102, it may be desirable to also use a pitch rate sensor (e.g., a gyroscope) 42 to provide a pitch rate signal indicative of a pitch rate of the machine 10. The controller 31 may utilize an acceleration signal provided by the accelerometer 40 together with the pitch rate signal provided by the pitch rate sensor 42 to determine the acceleration of the machine 10 along the ground or generally parallel to centerline 24 of the machine. If desired, filtering techniques may be used to reduce the noise associated with the acceleration signal from the accelerometer 40. Other manners of determining the acceleration of machine 10 are also contemplated. In some circumstances, it may desirable to determine the velocity of the machine 10 and then differentiate the velocity to determine the acceleration of the machine.

Through the use of an implement load sensor system 36, controller 31 is able to determine from a change in load on blade 16 that machine 10 is adjacent the crest 102. As a result, even if the controller 31 has not determined that the machine 10 is adjacent the crest 102 based upon the position sensor system 33 and the map of the outer boundary 106, the controller 31 may issue an alert command and may reverse the machine away from crest 102.

The load on the implement may be affected by the slope of the terrain upon which the machine 10 is moving. Accordingly, if desired, the accuracy of the implement load measurement may be increased by utilizing the implement load sensor system 36 in conjunction with a slope or inclination sensor such as pitch angle sensor 41. For example, if the machine 10 is moving uphill, the load on the blade may be higher due to gravity as compared to a machine operating in the same conditions on flat terrain. Similarly, the load on the blade 16 may be lower for the same conditions when operating the machine in a downhill orientation. By determining the slope of the terrain, the controller 31 may more accurately determine changes in the load on the blade 16.

In addition to the implement load monitoring systems 35 described above, other crest detection systems 34 may be used either alone or in combination with more than one crest detection system. One such crest detection system may use other sensors as a change in terrain sensor system for determining a change in terrain or proximity of machine 10 to crest 102. In one example, a pitch angle as indicated by a pitch angle sensor 41 that exceeds a threshold pitch angle or is outside of an expected range of pitch angles may indicate that the machine 10 is adjacent the crest 102. In another example, a change in pitch rate as indicated by a pitch rate sensor 42 that exceeds a threshold rate or is outside an expected rate may indicate that the machine 10 is adjacent the crest 102. Still further, additional systems and sensors may be used to determine a change in terrain or proximity of machine 10 to crest 102. For example, perception sensors for use with systems such as vision, laser, radar or sonar systems may also be used to detect the physical location of crest 102. Machine 10 may incorporate any or all of the crest detection systems disclosed herein and may incorporate other systems that perform similar functions, if desired.

The control system 30 and its associated sensors may be configured to operate the machine 10 in an autonomous manner, in a semi-autonomous manner, by remote control, or with an operator in the cab 26. As stated above, there may be situations in which the outer boundary 106 stored within or remotely from controller 31 does not accurately reflect the actual boundary of the crest 102. Accordingly, rather than relying on the position sensing system 32 to determine whether the machine 10 has actually reached the crest 102, additional sensors may be provided to determine whether the machine has reached the crest. The controller 31 and such additional sensors may operate as a crest detection system 34 to provide an additional margin of safety when operating machine 10 autonomously or semi-autonomously with respect to movement and positioning of the machine. The crest detection system 34 may also be used in other situations, if desired, such as when an operator is operating the machine remotely or when an operator is in the cab 26.

In view of the extreme consequences of operating the machine to close to the crest, it may be desirable to exercise extra caution when the machine is within the crest zone. the crest detection system 34 may be configured to operate in a different manner (such as with different levels of sensitivity, different functionality or by using different change in terrain sensor systems) when operating the machine within the crest zone as compared to operation outside of the crest zone.

As the machine moves, the controller 31 may monitor various systems and operating conditions of the machine that are indicative of a change of terrain. In one embodiment, the controller may receive operating data generated by one or more of the change in terrain sensor systems that is indicative of a change in terrain adjacent the machine 10. The controller 31 may include or store a first data map of operating data indicative of a change in terrain for use when the machine is outside of the crest zone. A second data map indicative of a change in terrain may be included or stored within the controller for use when the machine is within the crest zone. The controller 31 may compare operating data from the sensor systems received while the machine 10 is operating outside of the crest zone 103 to the first data map and compare the operating data from the sensor systems received while the machine 10 is operating within the crest zone 103 to the second data map.

For example, while the machine 10 is operating outside of the crest zone 103, the controller 31 may monitor the pitch angle of the machine 10 and compare the pitch angle to a first data map indicative of a change in terrain. If the change in terrain exceeds a predetermined threshold, the controller 31 may determine that the machine 10 has encountered an unsafe condition and generate an alert command. The alert command may also include a signal to reverse the machine 10. When the machine 10 is operating within the crest zone, the controller 31 may also be configured to determine the pitch angle of the machine. However, the controller 31 may be configured to generate an alert command upon the pitch angle of the machine 10 exceeding a relatively small threshold.

If desired, additional or different functionality may be utilized when the machine 10 is operating within the crest zone 103 as compared to operation outside of the crest zone. For example, the controller 31 may be configured to also determine a moving average pitch angle when the machine is operating within the crest zone 103 for a predetermined distance of movement of the machine 10. The controller 31 may also compare the current pitch angle to the moving average pitch angle. As a result, the controller 31 may be able to not only monitor the pitch angle of the machine 10 to determine whether it has exceeded a predetermined threshold but also monitor the change in pitch angle to determine whether a change in pitch angle or pitch rate of the machine 10 indicates proximity to the crest 102. Through such a configuration, an additional function (pitch rate) may be added to the process of determining proximity to the crest 102.

In another example, a perception system such as a laser system may be used as a crest detection system 34. In doing so, the scan rate of the laser system may be increased when the machine 10 is operating within the crest zone 103 as compared to operation outside of the crest zone. As a result, changes in terrain may be more quickly detected.

In addition to utilizing first and second data maps and adding functionality within the crest zone 103, the operating data may be treated differently (such as by different types of filtering) when the machine 10 is operating inside the crest zone 103 as compared to operation of the machine outside the crest zone. In an example in which the crest detection system 34 is an implement load monitoring system 35 that monitors the load on the blade 16 such as by measuring the difference between the input and the output of the torque converter 17, the data received by the controller 31 may be filtered differently when the machine 10 is inside the crest zone 103 as compared to when the machine is outside of the crest zone. In general, greater movement of the machine may be permitted outside the crest zone 103 as compared to when the machine is operating within the crest zone.

The controller 31 may be configured to perform multiple filtering processes on the signals generated by the implement load sensor system 36. While outside of the crest zone 103, the controller 31 may perform more filtering of the signals from the implement load sensor system 36 in order to generate fewer false positive signals that will result in the generation of an alert command and possibly the reversal of machine 10. However, in general, the greater the filtering, the slower the filtering process. Accordingly, it may not be desirable to perform as much filtering of the signals when the machine 10 is within the crest zone 103 or when adjacent the crest 102.

More specifically, when the machine 10 is operating outside the crest zone 103, the controller 31 may perform multiple filtering functions on the signals and utilize a first set of cutoff frequencies. The additional filtering may result in fewer false positive alert commands. When operating the machine 10 within the crest zone 103, the controller 31 may be configured to provide a faster response by performing fewer filtering functions on the signals or by utilizing a second set of cutoff frequencies. In some instances, the filtering within the crest zone 103 may be configured to improve the controller's ability to recognize different types of slopes adjacent a crest 102 to determine whether the machine 10 is adjacent the crest 102. In any of the filtering operations, the controller 31 may attribute different weight to modified signals that have been filtered at different frequencies in order to more accurately determine the position of the crest 102.

It should be noted that the sensor system used to provide the operating data when the machine 10 is outside the crest zone 103 may be the same or may be different from the sensor system used to provide the operating data when the machine is within the crest zone. Still further, more than one sensor system may be used to generally simultaneously provide operating data when the machine is outside of or within the crest zone 103. As a result, different operating characteristics may be monitored when the machine 10 is outside of the crest zone 103 as compared to when the machine is inside the crest zone. In other words, it is not necessary to monitor the same operating characteristics (e.g., implement load or pitch angle) when the machine 10 is within the crest zone 103 and as when it is outside of the crest zone. It may be more desirable to monitor certain operating characteristics when the machine is outside of the crest zone 103 and monitor other operating characteristics when the machine is within the crest zone. For example, while the machine 10 is outside of the crest zone 103, the controller 31 may only monitor the pitch angle and compare it to a first data map of the pitch angle to determine whether the pitch angle of the machine 10 has exceeded a predetermined threshold. While within the crest zone 103, the machine 10 may not only monitor the pitch angle and compare it to a second data map of the pitch angle but may also monitor other operating characteristics such as the load on the blade 16, and/or may rely on other sensor systems such as perception sensors to determine a change in terrain.

Figure 3:
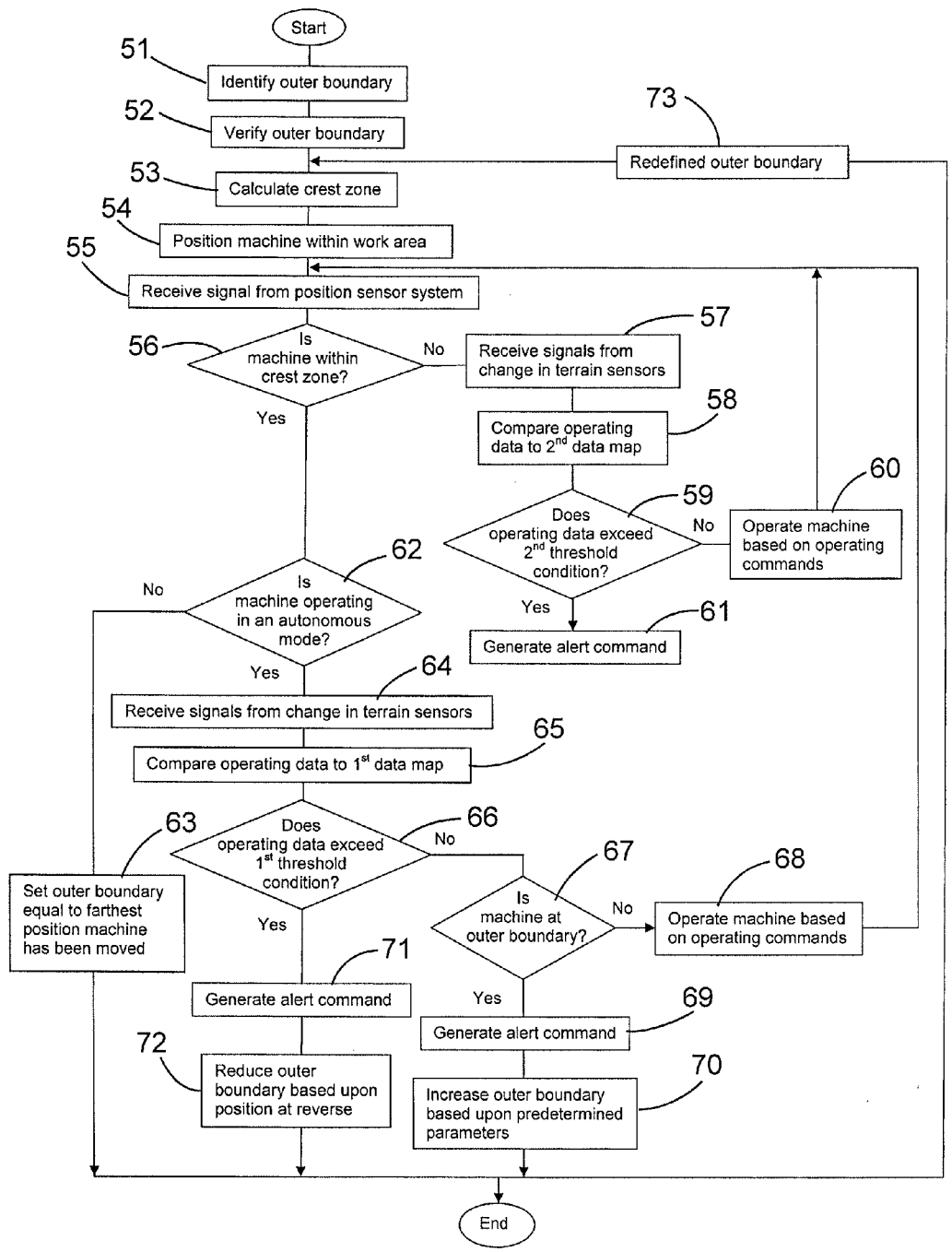
FIG. 3 shows a flowchart illustrating a process in accordance with the disclosure.

Referring to FIG. 3, a flow chart is depicted showing a process that may be used with a crest detection system 34 along a crest 102. At stage 51, the outer boundary 106 of the work area 101 is determined. The outer boundary 106 may be determined by a topographical map of the earth at the work site 100. In an alternate step, the outer boundary 106 may be determined by moving a mapping vehicle along the crest 102 to establish the outer boundary. Once the outer boundary 106 has been generated, the outer boundary may be displayed on an output device such as a display screen and verified by the operator at stage 52.

The controller 31 may calculate the crest zone 103 at stage 53. The crest zone 103 may be a predetermined distance from outer boundary 106. The width of the crest zone 103 or the distance the crest zone boundary 108 extends from the outer boundary 106 may be established for the entire work site 100, for a particular work area 101 or for a portion of the work area. The width of the crest zone 103 may be set based upon the risks associated with operation near the crest 102 such as the height and angle of the slope adjacent the crest, the environmental conditions in which the machine 10 is operating as well as the type of material upon which the machine 10 is operating or moving. In one example, the width of the crest zone 103 may be 1-2 times the length of the machine 10. In other examples, the width of the crest zone may be between 10-40 feet.

After the outer boundary 106 and the crest zone 103 have been set, the machine 10 may be positioned and operate within work area 101 at stage 54. The controller 31 receives at stage 55 position signals from the position sensor system 33 indicative of the position of the machine within the work area 101. At decision stage 56, the controller 31 determines whether the machine 10 is in the crest zone 103 based upon the position signal received from the position sensor system 33.

If the machine 10 is not within the crest zone 103, the controller receives at stage 57 signals in the form of operating data indicative of a change in terrain adjacent the machine 10 from one or more of the change in terrain sensor systems such as implement load sensor system 36 or sensor systems associated with other crest detection systems 34. The controller 31 compares the operating data from the change in terrain sensor systems to a second data map of the controller. As used herein, the operating data received at stage 57 is sometimes referred to herein as the second operating data as it is compared to the second data map.

At decision stage 59, the controller 31 determines whether the second operating data from the change in terrain sensor system exceeds a threshold condition (i.e., a second threshold condition) of the second data map. This may be accomplished through the use of the crest detection system 34 as described above which may include an implement load sensing system 35, a change in terrain sensing system such as one that uses a pitch angle sensor 41 and/or a pitch rate sensor 42, perception based systems such as vision, laser, sonar or radar as well as other systems. The second operating data may be from more than one change in terrain sensor system and the second data map may include more than one second threshold condition against which the second operating data is compared. More specifically, if more than one change in terrain sensor system is being used to provide the second operating data, the second data map may include a different second threshold condition to be compared against the second operating data from each sensor system. The controller 31 may be configured so that only one second threshold condition must be exceeded in order to generate an alert command as discussed below with respect to stage 61.

As an example, if using an implement load sensing system 35, the controller 31 may compare the implement load signal received from the implement load sensor system 36 to the second data map of the controller 31 to determine whether a change in terrain has occurred. The controller 31 may determine whether the change in terrain determined based upon the change in load on the ground engaging work implement exceeds a predetermined second threshold condition. In an alternate configuration, the controller 31 may determine whether the change in load is within an expected range. Similarly, a pitch angle sensor 41 may provide the second operating data to the controller 31 indicative of the pitch angle of the machine 10. The controller 31 may determine whether the pitch angle of the machine exceeds a different predetermined second threshold condition. In an alternate configuration, the controller 31 may determine whether the pitch angle is within an expected range.

If the operating data does not exceed the second threshold condition at decision stage 59, the machine 10 is operated at stage 60 based upon instructions or operating commands from the controller 31 and/or the wireless network system 105. If the second operating data does exceed the second threshold condition, the controller may generate at stage 61 a second alert command which may include stopping operation or reversing of the machine.

If the machine 10 is within crest zone 103 at decision stage 56, the controller 31 determines at decision stage 62 whether the machine 10 is operating autonomously or semi-autonomously with respect to the movement or positioning of the machine. If the machine 10 is being operated or positioned by an operator using a remote control or within the cab 26 rather than autonomously or semi-autonomously, the controller 31 may monitor the movement of machine 10 near the outer boundary 106 and modify the outer boundary 106 based upon the movement of the machine. More specifically, the controller 31 may monitor the movement of the machine 10 and determine the farthest position the machine (e.g., the blade 16) has been moved past the outer boundary 106. In doing so, the controller 31 may monitor the position of the datum or reference point of the machine 10 and use the dimensions of the machine to determine the farthest position that the machine has moved past the boundary 106.

It should be understood that in such a mode of operation, since the machine 10 has been manually moved safely past the previously set outer boundary 106, it may be desirable to permit the machine to be moved past the outer boundary when operating autonomously or semi-autonomously with respect to the movement or positioning of the machine. Accordingly, the controller 31 may modify the outer boundary 106 at stage 63 and set it equal to the farthest position that a portion of the machine 10 has been moved past the outer boundary. In an alternate process step, the operator may manually set the outer boundary 106, for example with an input device, when the machine 10 is at a desired position.

If the machine 10 is operating autonomously or semi-autonomously with respect to the movement or positioning of the machine at decision stage 62, the controller receives at stage 64 signals in the form of a set of operating data indicative of a change in terrain adjacent the machine 10 from one or more of the change in terrain sensor systems such as implement load sensor system 36 or sensor systems associated with other crest detection systems 34. As used herein, the operating data received at stage 64 is sometimes referred to herein as the first operating data as it is compared to the first data map. As with the second operating data described above, the first operating data may be received from more than one change in terrain sensor system. In addition, the first operating data received at stage 64 may be from the same or different sensor systems than those that generated the second operating data received at stage 57.

At stage 65, the controller 31 compares the first operating data received at stage 64 from the change in terrain sensor system to a first data map of the controller. At decision stage 66, the controller 31 determines whether the first operating data from the change in terrain sensor system exceeds a threshold condition (i.e., a first threshold condition) of the first data map in a generally similar manner as described above with respect to the second operating data at stages 58-59. As with the second operating data described above, the first operating data may be from more than one change in terrain sensor system and the first data map may include more than one first threshold condition against which the first operating data is compared. In addition, the first operating data received at stage 64 and compared to the first data map at stage 65 may be generated by different sensor systems than those that generated the second operating data received at stage 57. In other words, the second operating data received at stage 57 and compared to the second data map at stage 58 may be generated by any one or more of the sensor systems associated with machine 10 and the first operating data received at stage 64 and compared to the first data map at stage 65 may be generated by any one or more of the sensor systems associated with the machine.

If the change in terrain sensor system does not indicate proximity to the crest 102 at decision stage 66, the controller may determine through the position sensing system 32 at decision stage 67 whether the machine 10 has reached the outer boundary 106. If the machine 10 is not at the outer boundary 106, the machine is operated at stage 68 based upon instructions or operating commands from the controller 31 and/or the wireless network system 105. If the change in terrain sensor system does not indicate proximity to crest 102 at decision stage 66 and the machine 10 has reached the outer boundary 106 at decision stage 67, the controller 31 may generate at stage 69 an alert command signal (i.e., a first alert command signal), which may include a reverse command, and the machine 10 may be reversed.

As material is moved over the crest 102, the sloped area adjacent the crest may eventually be filled in. As a result, the surface area on which the machine may travel (and thus the position of the crest 102) may eventually be extended. In such case, the location of the outer boundary 106 may also be moved.

As the sloped area adjacent crest 102 is filled in, it may be desirable for an operator to operate the machine 10 remotely or from cab 26 and use the process described above relative to stage 63 to change the outer boundary 106. In an alternate process, the outer boundary 106 may be automatically extended at stage 70 by an incremental amount or enlargement increment based upon the machine 10 reaching the outer boundary 106 without the change in terrain sensor system indicating proximity to the crest at state 66. When automatically extending the outer boundary 106, it will often be desirable to extend the outer boundary in a relatively cautious manner. Accordingly, the controller 31 may be configured with the enlargement increment being relatively small or even zero based upon the conditions of the operating environment of the machine.

The enlargement increment may be based upon the slope of the area to be filled in by material, the angle of repose of the material 104 being moved, the environmental conditions in which the machine 10 is being operated, and the timeline of the operation of moving the material. For example, if the slope of the area being filled in is relatively steep, the controller 31 may be set to utilize a relatively small enlargement increment (or even a zero increment) due to the risks associated with operating the machine 10 near the crest 102. If the material 104 is relatively unstable, such as sand and other similar materials, the enlargement increment may also be relatively small. Still further, the enlargement increment may be set to zero at the beginning of a project and only increased after a certain period of time or a number of material moving cycles have occurred.

In another aspect, the controller 31 may be configured so that the enlargement increment is volume based. In such case, a general volume of the area to be filled in beyond the crest 102 may be determined together with an angle of repose of the material 104. Based upon the calculated volume and the angle of repose, the controller 31 may be configured to only permit a non-zero enlargement increment after a predetermined number of material movement cycles.

If the change in terrain sensor system indicates at stage 66 that the machine 10 is in proximity to the crest 102, the controller 31 may generate at stage 71 an alert command signal (i.e., a first alert command signal), which may include a reverse command signal, and the machine may be reversed. At stage 72, the controller 31 may revise or reduce the outer boundary 106 (i.e., move the outer boundary further into the work area 101). In one configuration, the outer boundary 106 may be revised to the position of the machine 10 (or the furthest point of the machine) as determined by the position sensing system 32 at the current position or point at which the controller 31 determined that the machine 10 was in proximity to crest 102. In other words, since the controller 31 sensed the crest 102 before the machine reached the outer boundary 106, the outer boundary 106 may extend too close or even into the crest 102. Accordingly, the controller 31 may reduce the outer boundary 106 to match the position of the machine 10 when the change in terrain exceeds the expected range of change in terrain. In an alternate configuration, the controller 31 may set the outer boundary 106 to match the position of the machine 10 at the point at which the machine is reversed and begins moving backwards. In still another alternate configuration, a path representative of the crest 102 may be modified based upon the position of the machine 10.

As set forth above, the outer boundary 106 may be modified under numerous conditions. For example, at stage 63, the outer boundary 106 may be manually or automatically set during manual operation of the machine 10 by an operator, either remotely or with an operator in the cab 26. In another example, the outer boundary may be increased at stage 70 based upon the machine 10 reaching the outer boundary 106. At stage 72, the outer boundary 106 may be reduced based upon an alert command signal from the crest detection system 34. In each of these instances, the redefined or modified outer boundary may be stored in controller 31 and/or communicated and stored remotely within a network system distinct from the machine 10 such as one associated with wireless network system 105. Such modified outer boundary may be used at stage 73 as the new outer boundary for the process flow of FIG. 3.

By communicating the redefined outer boundary to another system, the redefined outer boundary may be transmitted, directly or indirectly, to other machines so that the other machines may utilize the updated data of the redefined outer boundary. In one example, the redefined outer boundary may be transmitted by the controller 31 of a machine to another system such as a remote or wireless network system 105 (i.e., using network communications). Each of the machines 10 operating near or in the vicinity of the outer boundary may transmit data between their controller 31 and the wireless network system 105 to update the position of the outer boundary 106 within the wireless network system. The updated outer boundary 106 may be transmitted from the wireless network system 105 to each of the machines 10 operating in the vicinity of the outer boundary. In another example, each machine 10 may communicate the updated outer boundary 106 directly to other machines operating in the vicinity of the outer boundary (i.e., using peer-to-peer communications). A combination of network and peer-to-peer communications may also be used.

It should be noted that the crest zone boundary 108 may be initially set through the use of outer boundary 106 or some other means. Thereafter, the controller 31 may alter the crest zone boundary 108 based upon modifications to the outer boundary 106. In an alternate configuration, the process set forth above that modifies the position of the outer boundary 106 (and thus subsequently the crest zone boundary 108) may bypass modifying the outer boundary 106 and modify the crest zone boundary 108 directly. The modified crest zone boundary 108 may be stored within or remotely from the controller 31. Operation of machine 10 may be based, to some extent on the position of the modified crest zone boundary 108 rather than the position of the outer boundary. In other words, the controller 31 may determine the outer boundary 106 as a predetermined distance from the modified crest zone boundary 108 and the machine 10 operated as a function of the movement a predetermined distance past or within the crest zone boundary.

INDUSTRIAL APPLICABILITY

The industrial applicability of the control system 30 described herein will be readily appreciated from the foregoing discussion. The foregoing discussion is applicable to machines 10 that operate adjacent a crest 102. The machine 10 may operate in an autonomous, semi-autonomous or manual manner to move material at a work site 100, such as a mining site, from a first position to a second position over a crest 102.

As the machine 10 moves, the controller 31 may monitor various systems and operating conditions of the machine. The controller 31 may include a first data map (such as that indicative of a load on the blade 16) against which the operating data or characteristics of the machine 10 is compared when operating within the crest zone 103. A second data map may be compared to the operating data or characteristics of the machine when the machine 10 is operating within the work area 101 but outside the crest zone 103. Through such a configuration, the control system 30 may monitor the operating data of the machine 10 relatively closely while the machine is within the crest zone 103 without unduly limiting or slowing the operation of the machine when it is outside of the crest zone and thus a significant distance from the crest 102.

When operating the machine 10 adjacent the crest 102, the outer boundary 106 may not always coincide with the physical location of crest 102. In some instances, material adjacent the crest 102 may move, shift or collapse after the outer boundary 106 has been set. In other instances, material may be moved adjacent the crest either by machine 10 or by another machine. In either instance, it may be desirable to utilize an additional system to automatically modify or update the outer boundary 106. In instances in which the crest detection system 34 determines that the machine 10 has encountered the crest 102 before the position sensing system 32 indicates that the machine is adjacent the outer boundary 106, the position sensing system 32 may modify the outer boundary 106 so that it coincides with the position of the crest 102 as determined by the crest detection system 34. In instances in which the machine 10 reaches the outer boundary 106, the outer boundary may be automatically enlarged. This will minimize the likelihood that material 104 will build up adjacent the crest 102 rather than being pushed over the edge of the crest 102. As a result, the system as described above is configured to improve the performance and efficiency of the operation of machine 10 as well as reduce the likelihood of the machine being moved too close to the crest 102.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for automated control of a machine within a work area having a crest, comprising:
a position sensing system for generating position signals indicative of the position of the machine;
at least one sensor system for generating operating data indicative of a change in terrain, the at least one sensor system being operative to measure a different characteristic of the machine than the position sensor system and generate second operating data, the operating data and the second operating data being indicative of different types of operating characteristics of the machine, one of the operating data and the second operating data being indicative of a load on a ground engaging work implement and another of the operating data and the second operating data being indicative of a pitch angle of the machine;
a controller configured to:
store a work area for the machine including a crest zone within the work area that extends a predetermined distance from the crest into the work area;
store a first data map of operating data for use while the machine is operating within the crest zone;
store a second data map of operating data for use while the machine is operating outside of the crest zone;
determine whether the machine is within the crest zone based upon the position signals;
compare the operating data to the first data map of operating data while the machine is within the crest zone to determine whether the operating data exceeds a first threshold condition;
generate a first alert command signal if the operating data exceeds the first threshold condition while the machine is operating within the crest zone;
compare the second operating data to the second data map of operating data while the machine is outside of the crest zone to determine whether the second operating data exceeds a second threshold condition; and
generate a second alert command signal if the second operating data exceeds the second threshold condition while the machine is operating outside of the crest zone.

2. The system of claim 1, wherein the operating data and the second operating data are indicative of the pitch angle of the machine.

3. The system of claim 1, wherein the controller is further configured to filter the operating data and the second operating data differently.

4. The system of claim 1, wherein the positioning sensing system includes a GPS sensing system.

5. The system of claim 1, wherein the at least one sensor system includes an implement load sensor system configured to measure a load on a ground engaging work implement and provide an implement load signal indicative of the load on the ground engaging work implement to the controller, and wherein the operating data is indicative of the load on the ground engaging work implement.

6. The system of claim 1, wherein the at least one sensor system includes a pitch angle sensor configured to measure a pitch angle of the machine, and the operating data is indicative of the pitch angle of the machine.

7. The system of claim 1, wherein the at least one sensor system includes a perception sensor configured to measure an angle of terrain adjacent the machine, and the operating data is indicative of the angle of a ground surface adjacent the machine.

8. A machine comprising:
a prime mover;
a position sensing system for generating position signals indicative of the position of the machine;

at least one sensor system for generating operating data indicative of a change in terrain, the at least one sensor system being operative to measure a different characteristic of the machine than the position sensor system and generate second operating data, the operating data and the second operating data being indicative of different types of operating characteristics of the machine, one of the operating data and the second operating data being indicative of a load on a ground engaging work implement and another of the operating data and the second operation data being indicative of a pitch angle of the machine;

a controller configured to:

store a work area for the machine including a crest zone within the work area that extends a predetermined distance from a crest into the work area;

store a first data map of operating data for use while the machine is operating within the crest zone;

store a second data map of operating data for use while the machine is operating outside of the crest zone;

determine whether the machine is within the crest zone based upon the position signals;

compare the operating data to the first data map of operating data while the machine is within the crest zone to determine whether the operating data exceeds a first threshold condition;

generate a first alert command signal if the operating data exceeds the first threshold condition while the machine is operating within the crest zone;

compare the second operating data to the second data map of operating data while the machine is outside of the crest zone to determine whether the second operating data exceeds a second threshold condition; and generate a second alert command signal if the second operating data exceeds the second threshold condition while the machine is operating outside of the crest zone.

9. The machine of claim 8, wherein the at least one sensor system includes an implement load sensor system configured to measure a load on a ground engaging work implement and provide an implement load signal indicative of the load on the ground engaging work implement to the controller, and wherein the operating data is indicative of the load on the ground engaging work implement.

* * * * *